(12) United States Patent
Jahn

(10) Patent No.: US 7,156,407 B2
(45) Date of Patent: Jan. 2, 2007

(54) WHEELCHAIR TIRE

(75) Inventor: Holger Jahn, Bergneustadt (DE)

(73) Assignee: Ralf Bohle GmbH + Co. KG, Reichshof (DE)

(*) Notice: Subject to any disclaimer, the term of this patent is extended or adjusted under 35 U.S.C. 154(b) by 492 days.

(21) Appl. No.: 10/087,933

(22) Filed: Mar. 5, 2002

(65) Prior Publication Data

US 2002/0125678 A1    Sep. 12, 2002

(30) Foreign Application Priority Data

Mar. 6, 2001 (DE) ............................ 201 04 394 U

(51) Int. Cl.
*B60C 3/06* (2006.01)
*A61G 5/02* (2006.01)

(52) U.S. Cl. .................................. 280/250.1; 152/209.1

(58) Field of Classification Search ................ 180/218; 280/86.751, 250.1, 304.9, 304.1; 152/280, 152/209.1
See application file for complete search history.

(56) References Cited

U.S. PATENT DOCUMENTS

| | | | | |
|---|---|---|---|---|
| 452,001 | A * | 5/1891 | Yagn .......................... | 152/323 |
| 2,281,359 | A * | 4/1942 | Kenner ...................... | 152/209.8 |
| 3,435,874 | A * | 4/1969 | Mirtain et al. ............ | 152/209.8 |
| 3,554,259 | A * | 1/1971 | Webb ........................ | 152/209.8 |
| 3,656,532 | A * | 4/1972 | Roberts ..................... | 152/455 |
| 3,679,257 | A * | 7/1972 | Jacuzzi et al. ............ | 297/42 |
| 3,930,527 | A * | 1/1976 | French ....................... | 152/520 |
| 4,351,540 | A * | 9/1982 | Minnebraker ............ | 280/250.1 |
| 4,489,955 | A * | 12/1984 | Hamilton .................. | 280/250.1 |
| 4,493,355 | A | 1/1985 | Ippen et al. | |
| 4,514,243 | A * | 4/1985 | Moore et al. ............... | 156/113 |
| 5,028,065 | A * | 7/1991 | Danecker .................. | 280/250.1 |
| 5,196,076 | A * | 3/1993 | Ochiai ....................... | 152/454 |
| 5,294,142 | A * | 3/1994 | Weege ....................... | 280/304.1 |
| 5,333,894 | A * | 8/1994 | Mayes ...................... | 280/250.1 |
| 5,944,390 | A * | 8/1999 | Parenzuela ................ | 301/58 |
| H001870 | H * | 10/2000 | Mizata et al. .............. | 152/310 |
| 6,142,201 | A | 11/2000 | Harms ....................... | 152/209.8 |
| 6,508,284 | B1 * | 1/2003 | Swift et al. ................ | 152/456 |
| 6,758,928 | B1 * | 7/2004 | Hubbell et al. ........... | 156/110.1 |

FOREIGN PATENT DOCUMENTS

DE    36 18 347    12/1987
DE    36 22 076    1/1988

OTHER PUBLICATIONS

European Office Action dated Nov. 24, 2005.

* cited by examiner

*Primary Examiner*—Kevin Hurley
(74) *Attorney, Agent, or Firm*—Crowell & Moring LLP

(57) ABSTRACT

A wheelchair tire has a carcass having a running profile applied to an interior side and optionally having a raised lettering. At least on an exterior tire wall, starting from a region later adjoining with wheel rim edges, to at least a first boundary plane extending through the center of the tire cavity, the carcass has a smooth construction without profiles and lettering. An intersection point of the first boundary plane on the tire extends maximally offset by an angle of 45° with respect to an intersection point of a center plane with the tire.

9 Claims, 2 Drawing Sheets

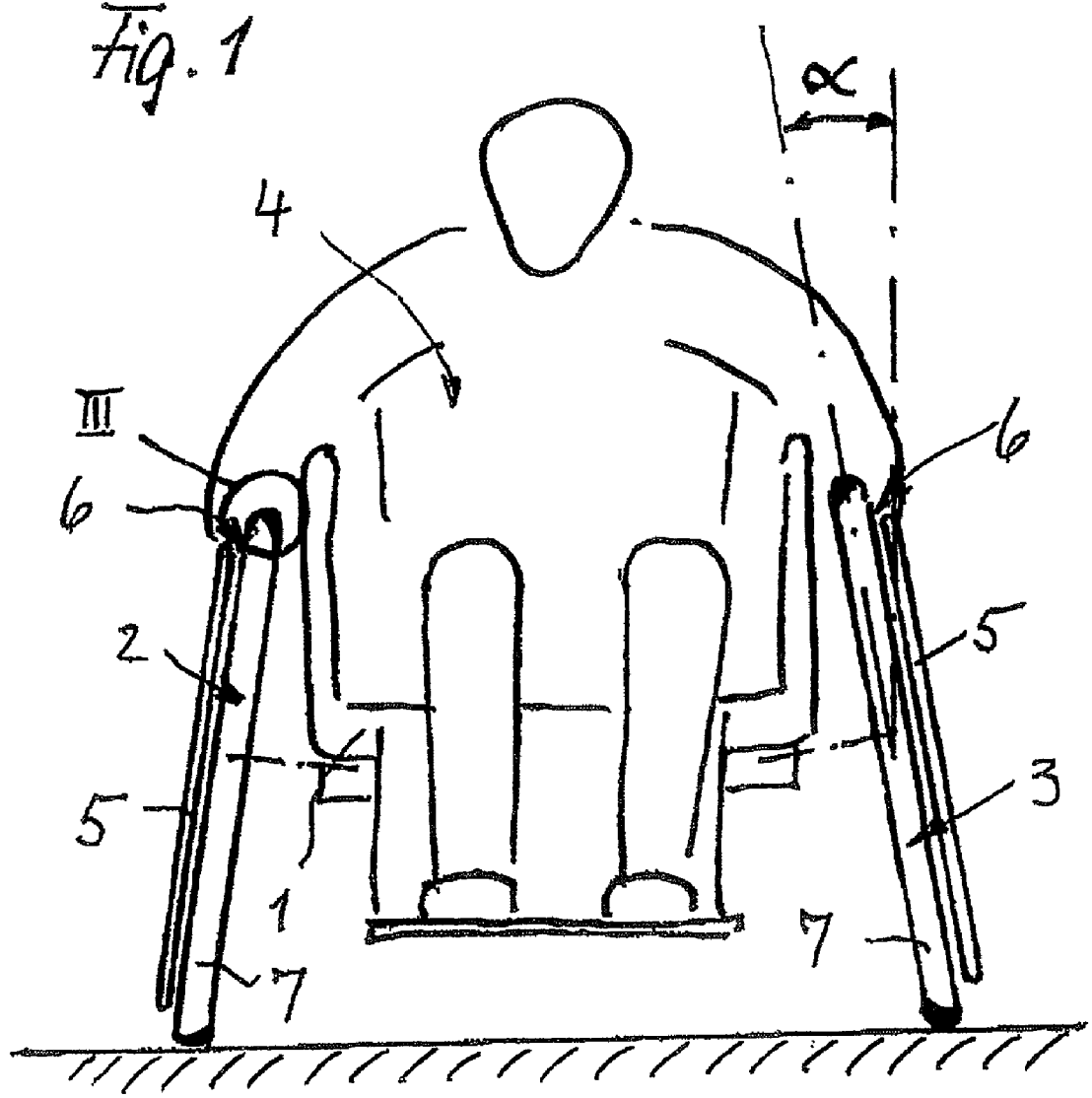

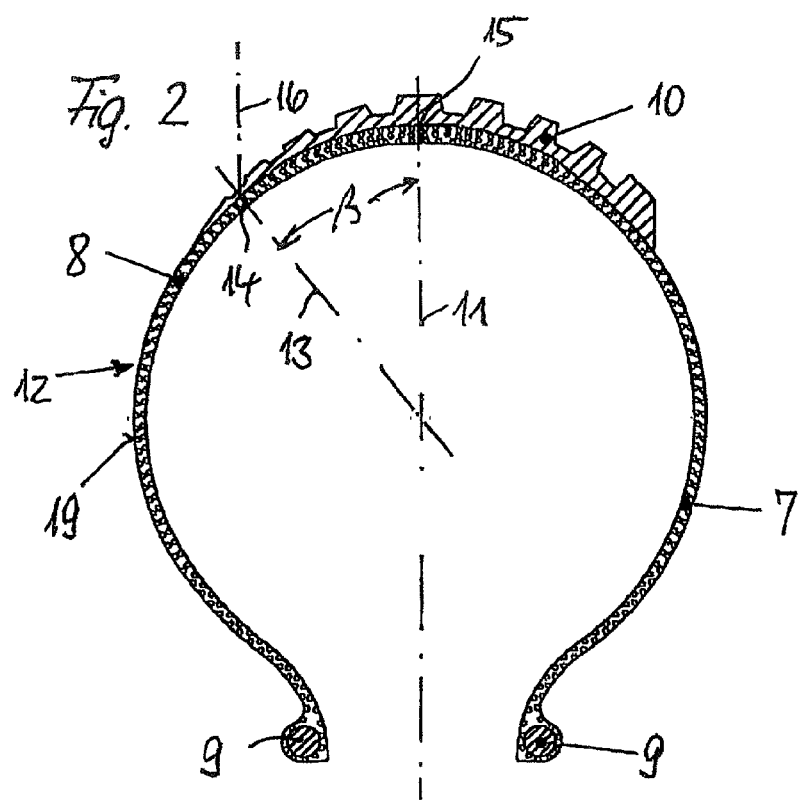
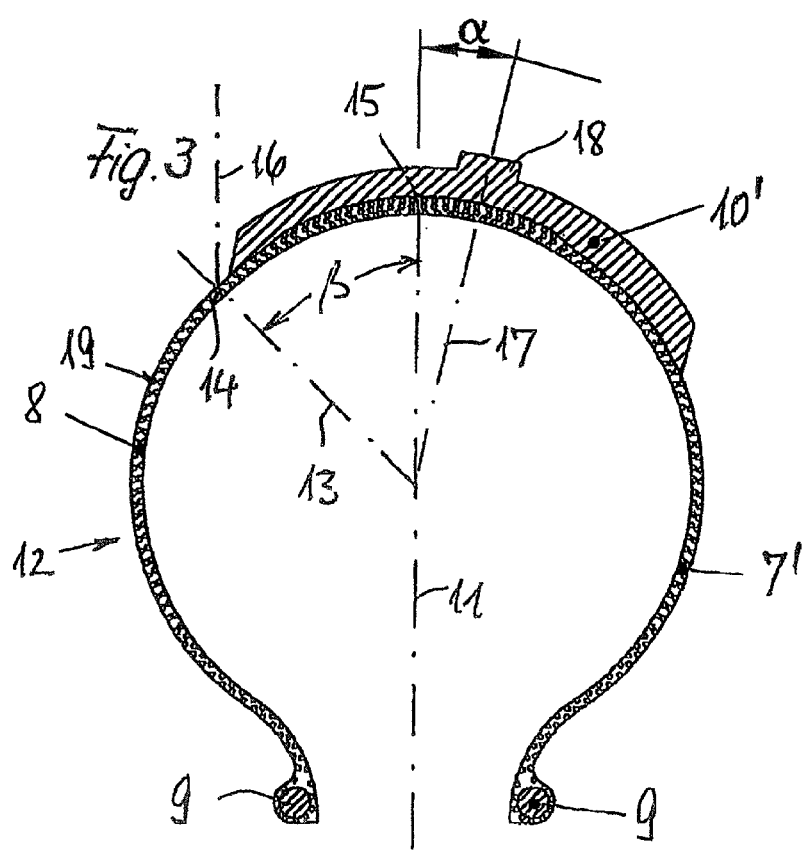

WHEELCHAIR TIRE

BACKGROUND OF THE INVENTION

This application claims the priority of 201 04 394.7, filed in Germany on Mar. 6, 2001, the disclosure of which is expressly incorporated by reference herein.

The invention relates to a wheelchair tire having a carcass and having a running profile applied to its exterior side and optionally having a raised lettering.

So far, wheelchair tires have been constructed in the same manner as bicycle tires. In this case, the running profile applied symmetrically with respect to the center plane of the tire projects into the region of the side wall. Conventionally, a raised lettering, which is also completely vulcanized, is present on the side wall. Such tires constructed in the manner of bicycle tires have been disadvantageous in the rehabilitation field when used for wheelchairs in that, for manually operated wheelchairs, the hands of the person sitting in the wheelchair come in contact with the running profile projecting upward and possibly also with the protruding lettering parts. This also applies if, as usually is the case, the wheelchair is not moved by the direct touching of the tire itself but by touching a driving ring disposed in front of the wheel on the outside at a relatively narrow distance. Such contacts, when they necessarily take place repeatedly, may result in injury to the operating person's hand.

It is an object of the invention to provide a remedy here and to provide an operationally friendlier and ergonomically better tire for wheelchairs and for the rehabilitation field.

For achieving this object, it is suggested in the case of a wheelchair tire of the initially mentioned type that, at least on an exterior tire wall, starting from the region resting against the rim edge, to at least a plane extending through the center of the tire cavity, the carcass is constructed to be smooth and free of profiles and lettering, the intersection point of the plane with the tire cover extending maximally offset by 45° with respect to the intersection point of the tire center plane with the tire.

The word "smooth" means that the exterior wall of the tire has no dynamo grooves, no partial mold seam and also no knobs which result from the arrangement of vent openings during the tire production.

By means of this further development, at least the side of the tire which later forms the exterior side of the wheel of the wheelchair can be designed such that, during the manual drive, the hands and particularly the ball of the thumb, which is to be placed on the interior side of the driving ring, cannot be chafed on the tire. The invention therefore results in a tire which is particularly suitable for the rehabilitation field, which deviates from conventional bicycle tires and is designed especially for being used on wheelchairs.

As a further development of the invention, the smooth and profile-free exterior side of the tire can be formed in that the running profile is arranged asymmetrically with respect to the center plane of the tire, and, only during the later mounting of the tire on the interior side of the wheel chair, thus, toward the operating person, has the actual tire profile which comes in contact with the ground and which always receives a lower depth toward the exterior side and then changes into the smooth exterior side.

However, embodiments are also contemplated by the invention which, include a wheelchair tire in with a running profile, which has a symmetrical construction per se, arranged in a laterally offset manner with respect to the center plane such that it extends on the side of the tire facing the operating person after the tire was mounted. Such a further development is recommended particularly also when the wheelchair wheels are arranged with a certain camber with respect to the vertical plane on the wheelchair such that the spacing of the two wheelchair wheels at their surfaces standing on the ground is larger than at the surfaces facing the wheelchair operator. If, as a further development of the invention, the lateral offset of the running profile is selected corresponding to the camber of the wheel arrangement, the running profile will roll on the ground with the desired full engagement while, at the top, in the area of the person sitting in the wheelchair, it is offset to the interior side of the wheelchair and thus to the person sitting in the wheelchair. Therefore, no profile exists on the side on which the operator's hands make contact for moving the wheel chair, thus on the exterior side of the two wheelchair tires, and a chafing of the operator's hands is effectively prevented.

As an advantageous further development of the invention, it can finally also be provided that the exterior side of the tire is provided with a particularly low-friction coating which, because of its sliding quality, protects the hands but can simultaneously largely also prevent a dirtying of the exterior side.

It is also contemplated to provide a wheelchair tire according to the invention only with a narrow profile extending in the center plane of the tire so that both exterior sides of the tire can be constructed to be smooth and without profiles in the sense of the invention. Such an embodiment, in which only little running profile is available to the ground engagement, is definitely expedient as a so-called "indoor tire". Injuries as a result of a chafing of the operator's hand can also be prevented by means of such a tire in the case of which no defined mounting arrangement has to be observed.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic frontal view of wheelchair which is equipped with tires according to the invention;

FIG. 2 is an enlarged representation of the detail III in FIG. 1 in a first embodiment; and FIG. 3 is an enlarged representation of the detail III in FIG. 1 in another embodiment.

DETAILED DESCRIPTION OF THE DRAWINGS

FIG. 1 illustrates schematically that the two larger wheels 2 and 3 of a wheelchair 1—whose smaller wheels are not shown—are each arranged at a camber with angle α with respect to a vertical plane on the wheelchair 1. In a known manner, the person 4 sitting in the wheelchair reaches over the top side of the wheels 2 and 3 and causes the driving of the wheelchair by grasping one driving ring 5 respectively in each case arranged in front of the wheels 2 and 3 on the outside. It is illustrated that, at the points 6, which are each situated in the region of the top side of the wheels and of the driving ring 5, it cannot be avoided that the hands of the person 4 sitting in the wheelchair come in contact with the exterior side of the tires 7 each arranged on the wheels 2 and 3. This may lead to a chafing of the hands, particularly of the thumb or of the ball of the thumb on the exterior side of the respective tire 7. This disadvantage occurs particularly when the tire, which is normally constructed in the manner of a bicycle tire, has a cleat profile which, on the outside, reaches far over the carcass 8 of the tire 7 and, on the side facing to the outside, also has a vulcanized-in raised lettering. Also the normally present small knobs, which originate from the vent opening of the production mold, contribute to injuries by chafing.

FIG. 2 is an enlarged representation of the tire arranged on the left in FIG. 1 in a first embodiment. In a manner known per se, the tire 7 has a toroidally extending carcass 8 which is provided on the bottom with two rim elevations 9 for the fastening to a rim which is not shown. In the case of this tire, the carcass 8 is provided with a running profile 10 which is constructed asymmetrically with respect to the center plane 11 of the tire and, on the side later forming the exterior side 12 of the tire, is completely smooth, without any projecting parts, thus without any lettering and, definitely to the schematically outlined first boundary plane 13, without any significant outward-projecting profile. The exterior side 12 also has no "vent knobs". The plane 13 extends through the center of the tire torus and has an intersection point 14 with the tire which is offset with respect to the intersection point 15 of the center plane 11 with the tire by the angle β to the outside. In this region, the profiling either does not exist at all or it has a lower depth. The profile becomes increasingly deep toward the center plane 11 and remains the same in this profile thickness on the later interior side of the tire 7.

It is easily understood that such a wheelchair tire, particularly when it is set at a camber such that the center plane 11 is situated diagonally with respect to the vertical line, has an extremely operating-friendly construction on its exterior side 12 which must later be gripped by the hands of the person 4 sitting in the wheel chair. A chafing of the hands is almost completely avoided without any disadvantageous effects on the running properties of the tire and of the wheelchair. In order to further improve the operation, the exterior wall of the tire facing the exterior side 12 may be provided with a low-friction, possibly also slidable coating 19.

FIG. 2 also illustrates that larger profile elevations, such as knobs or the like, of the running profile 10, to the outside, do not project beyond a second boundary plane 16 which extends parallel to the center plane 11 of the tire 7 and through the intersection point 14 of the first boundary plane 13 with the tire 7. This further development ensures that no projections or profile parts hindering the handling protrude into the gripping range. The second boundary plane 16 naturally represents only the outermost boundary. Depending on the desired profile type or construction, its position can also be displaced more toward the center plane 11. This naturally also applies to the first boundary plane 13 which is a radial plane. The angle β between this plane and the center plane 11 can naturally also be smaller than 45°. However, in no case should this angle be larger than 45°.

FIG. 3 shows a variant of the tire according to FIG. 2. In FIG. 3, identical parts have the same reference numbers as in FIG. 2.

The difference with respect to the tire according to FIG. 2 is here that the running profile 10' of the tire 7' is a symmetrically constructed running profile which has a plane of symmetry 17. In this context, the term symmetrical running profile means that the profilings projecting to the outside beyond the carcass 8 are constructed in their height to be symmetrical with respect to the plane 17. In this case, the type of the profiling can either also be symmetrical with respect to the plane 17 or may be different with respect to the arrangement of indentations or grooves. In the present case, it is only important that the running profile 10' may also be a running profile which is constructed completely symmetrical toward the plane 17 but, in the sense of the present invention, is arranged with its center plane 17 to be offset by the angle □with respect to the center plane 11 of the tire, specifically such that the carcass 8 is constructed later on the side 12 pointing toward the outside on the wheelchair, originating from the area resting against the rim edge 9, at least to the first boundary plane 13 to be completely free of profiles and lettering. Also in this case, no profile parts of the running profile 10' or vent knobs project toward this smoothly constructed exterior side of the carcass 8 beyond the second boundary plane 16.

In this case, as also outlined by means of FIG. 1, the angle of offset α can be adapted to the wheel camber of approximately 9° to 16°. Such a wheel camber is provided particularly in the case of sports wheelchairs. In such a case, the tire 7' would then come to rest with the center profile strip 18 of its running profile 10' on the ground surface on which the wheelchair 1 is moved.

It is also contemplated by the invention to provide, for example, the tire according to FIG. 2 as a so-called "indoor" tire with a running profile which is constructed symmetrically with respect to the center plane 11 but corresponds to the further development of the profile on the left of the center plane 11 illustrated in FIG. 2. A tire will then be created which, actually only still in the region of its center plane 11, has a profile which projects significantly beyond the carcass toward the outside but which is flattened toward both sides from the direction of the center plane 11. Such a tire, which is used predominantly for wheelchairs which are used only on the inside, however, has a sufficient running profile for this purpose and has the advantage that, irrespective of its mounting on the rim, even if the wheels are arranged without camber, is ergonomic and operationally friendly for the person sitting in the wheelchair who can then also grip the driving ring in a simple manner without having to fear that some parts of the hand are chafed by the exterior side of the tire.

By means of the invention, a tire which has decisive advantages has therefore been developed, especially for wheelchairs and for the rehabilitation field.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Wheelchair assembly comprising:
   a wheelchair seat for a wheelchair occupant, and a pair of wheels disposed at lateral sides of the seat and being manually rotatable by the wheel chair occupant,
   wherein each wheel includes a rim surrounded by a tire, each tire having a tire carcass surrounded by a running profile, and
   wherein the running profile of each of the tires is asymmetrically disposed with respect to a tire carcass center plane with portions of at least one of the running profile and carcass disposed laterally outward of a wheel chair in an in use position being configured to be smooth so as to limit chafing of a wheel chair occupant's hands when manually rotating a wheel with said tire mounted thereon.

2. Wheelchair assembly according to claim 1, wherein said wheels are mounted with a predetermined camber of between 9° and 16°.

3. Wheelchair assembly according to claim 1, wherein the running profile of each tire is asymmetrically configured with respect to the associated tire carcass center plane.

4. Wheelchair assembly according to claim 2, wherein the running profile of each tire is asymmetrically configured with respect to the associate tire carcass center plane.

5. Wheelchair assembly according to claim 1, wherein each wheel includes a driving ring manually engageable by the wheelchair occupant to drive the wheel.

6. Wheelchair assembly comprising:
a wheelchair seat for a wheelchair occupant, and a pair of wheels disposed at lateral sides of the seat and being manually rotatable by the wheel chair occupant,
wherein each wheel includes a rim surrounded by a tire, each tire having a tire carcass surrounded by a running profile,
wherein the running profile of each of the tires is asymmetrically disposed with respect to a tire carcass center plane with portions of at least one of the running profile and carcass disposed laterally outward of a wheel chair in an in use position being configured to be smooth so as to limit chafing of a wheel chair occupant's hands when manually rotating a wheel with said tire mounted thereon, and
wherein the running profile of each tire is symmetrically configured and arranged laterally offset with respect to the tire center plane by a predetermined offset angle.

7. Wheelchair assembly according to claim 2, wherein the running profile of each tire is symmetrically configured and arranged laterally offset with respect to the tire center plane by a predetermined offset angle; said predetermined offset angle corresponding to a predetermined camber of the respective wheel.

8. Wheelchair assembly comprising:
a wheelchair seat for a wheelchair occupant, and a pair of wheels disposed at lateral sides of the seat and being manually rotatable by the wheel chair occupant,
wherein each wheel includes a rim surrounded by a tire, each tire having a tire carcass surrounded by a running profile,
wherein the running profile of each of the tires is asymmetrically disposed with respect to a tire carcass center plane with portions of at least one of the running profile and carcass disposed laterally outward of a wheel chair in an in use position being configured to be smooth so as to limit chafing of a wheel chair occupant's hands when manually rotating a wheel with said tire mounted thereon, and
wherein each tire is provided with a low friction coating on the portions configured to be smooth.

9. Wheelchair assembly comprising:
a wheelchair seat for a wheelchair occupant, and a pair of wheels disposed at lateral sides of the seat and being manually rotatable by the wheel chair occupant,
wherein each wheel includes a rim surrounded by a tire, each tire having a tire carcass surrounded by a running profile, and
wherein the running profile of each of the tires is asymmetrically disposed with respect to a tire carcass center plane with portions of at least one of the running profile and carcass disposed laterally outward of a wheel chair in an in use position being configured to be smooth so as to limit chafing of a wheel chair occupant's hands when manually rotating a wheel with said tire mounted thereon, and a center of a ground contact area of the tire is substantially aligned with a center of the asymmetric running profile.

* * * * *